US010176463B2

(12) United States Patent
Abebe et al.

(10) Patent No.: US 10,176,463 B2
(45) Date of Patent: Jan. 8, 2019

(54) MACHINE LEARNING SYSTEM FOR INTELLIGENTLY IDENTIFYING SUITABLE TIME SLOTS IN A USER'S ELECTRONIC CALENDAR

(71) Applicant: International Business Machines Corporation, Armonk, NY (US)

(72) Inventors: Ermyas Abebe, Altona (AU); Jorge A. M. Ortiz, Melbourne (AU); Kent C. B. Steer, Brunswick (AU)

(73) Assignee: International Business Machines Corporation, Armonk, NY (US)

( * ) Notice: Subject to any disclaimer, the term of this patent is extended or adjusted under 35 U.S.C. 154(b) by 97 days.

(21) Appl. No.: 14/972,728

(22) Filed: Dec. 17, 2015

(65) Prior Publication Data
US 2017/0178080 A1 Jun. 22, 2017

(51) Int. Cl.
*G06Q 10/10* (2012.01)
*G06N 7/00* (2006.01)
*G06F 17/30* (2006.01)

(52) U.S. Cl.
CPC ... *G06Q 10/1095* (2013.01); *G06F 17/30424* (2013.01); *G06N 7/005* (2013.01)

(58) Field of Classification Search
None
See application file for complete search history.

(56) References Cited

U.S. PATENT DOCUMENTS

| | | | |
|---|---|---|---|
| 6,606,529 B1 * | 8/2003 | Crowder, Jr. | G06Q 10/04 700/100 |
| 7,689,995 B1 * | 3/2010 | Francis | H04N 21/4147 718/104 |
| 8,200,520 B2 * | 6/2012 | Chen | G06Q 10/06312 705/7.18 |
| 9,129,264 B2 * | 9/2015 | Lyle | G06Q 10/063116 |
| 2003/0149606 A1 * | 8/2003 | Cragun | G06Q 10/1095 705/7.19 |
| 2005/0091056 A1 * | 4/2005 | Surace | G10L 13/033 704/270.1 |

(Continued)

OTHER PUBLICATIONS

Khan, M. A., et al., "Preference-based meeting scheduler using ontology", Conf.Ttl: 2009 2nd International Conference on Computer, Control and Communication, IC4, Feb. 17-18, 2009, 6 pages, Publisher: IEEE Computer Society.

(Continued)

*Primary Examiner* — Thomas L Mansfield
(74) *Attorney, Agent, or Firm* — Scully, Scott, Murphy & Presser, P.C.; David M. Quinn, Esq.

(57) ABSTRACT

Training a machine to learn and to identify time slots to select in a user's electronic calendar, in one aspect, may include receiving an invitee list and meeting meta data associated with a meeting via an electronic calendar application. Candidate timeslots for the meeting may be determined and a database associated with the electronic calendar application analyzed to obtain user factors associated with the candidate timeslots and invitees in the invitee list. Based on the user factors, a predictive model may be generated that is associated with an invitee in the invitee list by a machine learning algorithm. The predictive model may be executed to determine a time slot to select for the invitee.

19 Claims, 4 Drawing Sheets

(56) References Cited

U.S. PATENT DOCUMENTS

| | | | |
|---|---|---|---|
| 2006/0200374 A1* | 9/2006 | Nelken | G06Q 10/109 |
| | | | 705/7.19 |
| 2007/0106725 A1 | 5/2007 | Starr et al. | |
| 2008/0222529 A1 | 9/2008 | Castelli et al. | |
| 2009/0216595 A1 | 8/2009 | Coulomb et al. | |
| 2010/0121665 A1 | 5/2010 | Boyer | |
| 2011/0320237 A1 | 12/2011 | Beaman et al. | |
| 2013/0218622 A1 | 8/2013 | MacKenzie et al. | |
| 2014/0188541 A1* | 7/2014 | Goldsmith | G06Q 10/06 |
| | | | 705/7.19 |
| 2014/0200943 A1 | 7/2014 | Febonio et al. | |
| 2015/0006217 A1 | 1/2015 | Buehl et al. | |
| 2015/0006221 A1* | 1/2015 | Mermelstein | G06Q 10/1095 |
| | | | 705/7.19 |
| 2015/0058057 A1* | 2/2015 | Egan | G06Q 10/1095 |
| | | | 705/7.19 |
| 2015/0247981 A1* | 9/2015 | Cruz | G02B 6/3853 |
| | | | 385/79 |
| 2015/0249747 A1* | 9/2015 | Boss | H04M 3/42221 |
| | | | 379/85 |
| 2015/0347980 A1* | 12/2015 | White | G06Q 10/1095 |
| | | | 705/7.19 |

OTHER PUBLICATIONS

Lee, W.-J., et al., "Fuzzy calendar algebra and its applications to data mining", Proceedings of the 11th International Symposium on Temporal Representation and Reasoning (TIME'04), Aug. 2004, 9 pages.

Lee, W.-J., et al., "An Efficient Algorithm to Discover Calendar-based Temporal Association Rules", 2004 IEEE ntemational Conference on Systems, Man and Cybernetics, Nov. 2004, pp. 3122-3127.

Korjus, O., "Meeting Scheduling Assistant: Automatic scheduling between heterogeneous calendar systems", Master's Thesis Espoo, Sep. 27, 2012, 115 pages.

* cited by examiner

US 10,176,463 B2

MACHINE LEARNING SYSTEM FOR INTELLIGENTLY IDENTIFYING SUITABLE TIME SLOTS IN A USER'S ELECTRONIC CALENDAR

FIELD

The present application relates generally to computers and computer applications, and more particularly to a machine learning system for intelligently identifying time slots in a user's electronic calendar.

BACKGROUND

Scheduling a meeting for multiple parties requires considerable manual effort on the part of the meeting organizer. For instance, the organizer must find a time and place that satisfies all constraints; or at least minimally violates the constraints. Existing calendar applications provide some assistance, however they require the organizer to combine the organizer's knowledge of an invitee's context and preferences with the binary availability information stored in the calendar. With existing systems, meeting organizers need to invest time, and may result in a reschedule, further inconveniencing the organizer and the invitees.

Consider as an example a user who would like to have periodic (e.g., fortnightly) 1-on-1 meetings with a team of 12 people. This user may also desire to have periodic meetings with the whole group. Setting a fixed time (e.g., 10 am every second Monday) for each of these meetings is a common practice, but it will introduce constraints for both the user and the team. In practice, many of these meetings may end up being rescheduled as other higher-priority and less flexible meetings arise. The user would have to then go into the calendar and find a new available timeslot.

BRIEF SUMMARY

A computer-implemented method of training a machine to learn and to identify time slots to select in a user's electronic calendar may be provided. The method, in one aspect, may include receiving an invitee list and meeting meta data associated with a meeting via an electronic calendar application. The method may also include determining candidate timeslots for the meeting. The method may further include analyzing a database associated with the electronic calendar application to obtain user factors associated with the candidate timeslots and invitees in the invitee list. The method may also include, based on the user factors, generating a predictive model associated with a respective invitee in the invitee list by a machine learning algorithm. The method may further include executing the predictive model on one or more of the hardware processors. The method may also include determining a time slot to select based on an output from the predictive model for the respective invitee. The method may further include combining time slots of respective invitees to determine a target time slot.

A system of training a machine to learn and identify time slots to select in a user's electronic calendar, in one aspect, may include one or more hardware processors operable to receive an invitee list and meeting meta data associated with a meeting via an electronic calendar application. One or more of the hardware processors may be further operable to determine candidate timeslots for the meeting. A storage device may store a database associated with the electronic calendar application. One or more of the hardware processors may be further operable to analyze the database to obtain user factors associated with the candidate timeslots and invitees in the invitee list. Based on the user factors, one or more of the hardware processors may be further operable to generate a predictive model associated with an invitee in the invitee list by a machine learning algorithm. One or more of the hardware processors may be further operable to execute the predictive model, and determine a time slot to select based on an output from the predictive model. One or more of the hardware processors may be further operable to combine time slots of respective invitees to determine a target time slot.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
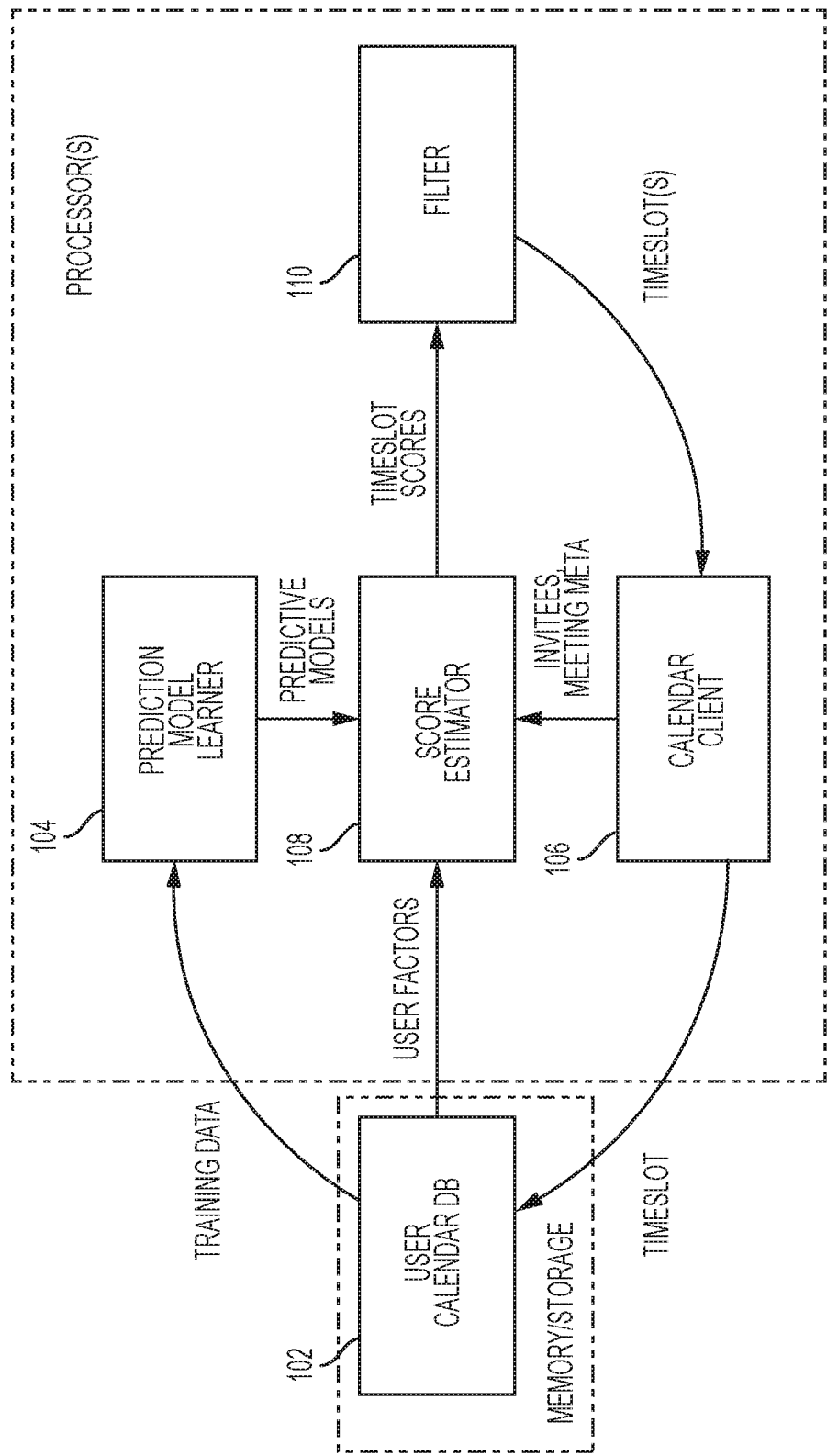
FIG. 1 is a diagram illustrating system components for a machine learning system for learning to intelligently identify suitable time slots in a user's electronic calendar and updating the calendar automatically in one embodiment of the present disclosure.

A computer-implemented system, method and techniques may be provided that automatically identify and rank timeslots for one or more invitees. The system and method in one embodiment may implement machine learning that trains a machine to learn soft constraints associated with meeting schedules and other patterns and/or preferences, for example, based on analyzing historical electronic calendar behavior. With these learnt associations, the system and method in one embodiment may estimate the suitability of different timeslots for meeting invitees. In one embodiment, the system and method in one embodiment may combine these estimates to derive a total suitability index. Filtering of options based on the total suitability index may be used to automatically select a timeslot without requiring additional input from the meeting organizer. In another aspect, the user may be presented with a shortlist of "best-fit" timeslots.

In one aspect, a machine trained to automatically learn suitability of times for an attendee (e.g., each attendee) may require less effort from a user. Deriving a total suitability index based on a combination of suitability scores provides for improved organizational efficiency as well as an evidence based decision making. In one aspect, existing calendar items may be treated as soft constraints, providing greater flexibility that may capture the actual options available to the organizer. Existing calendar item scores are dynamic as they can be updated as other factors change avoiding artificial lock-in wherein a timeslot is statically blocked out for a meeting in advance without accounting for changing factors, often leading to reschedules and cancellations. Calendars are currently filled in with a bias toward honoring existing meeting appointments even when shifting them would have no negative impact on any participant.

In one embodiment of a system and method of the present disclosure may automatically trigger the rescheduling of the conflicting calendar item to a "next best" slot for all attendees responsive to detecting the creation of the new higher priority meeting.

An embodiment of a method and/or system of the present disclosure may automatically find a suitable time, e.g., by defining suitability score $s_{it}$ for each invitee-timeslot pair. A timeslot is an interval—or set of intervals—in time. These scores can be combined to obtain a score for the total invitee list. An example of such a combination may be a simple average. For example, if N is the set of invitees then the score timeslot t is:

$$s_t = \frac{1}{N} \sum_{i \in N} s_{it} \quad (1)$$

The above computation treats all invitee's time as equally valuable.

In another embodiment, a method and/or system of the present disclosure may assume a weight $w_i$ is available for each invitee that encapsulates the importance of finding a suitable time for invitee i. This may represent their importance to the success of the meeting, or the importance of conveniencing this individual (e.g., wanting to demonstrate flexibility for an important client).

$$s_t = \frac{1}{N} \sum_{i \in N} w_i s_{it} \quad (2)$$

The suitability of a timeslot for an invitee may depend on a plurality of factors. One or more of such factors may be explicitly defined, for example, by a user. One or more of such factors may be inferred, for example, as disclosed herein.

An embodiment of a method and/or system of the present disclosure may implement a data-mining technique to obtain a mapping from contextual information to a suitability score estimate:

$$\hat{s}_{it} = \psi_i(t, c_i(t)) \quad (3)$$

where $c_i(t)$ is a set of context factors for individual i with respect to timeslot t. For example, $c_i$ may include, the location of the invitee on that day, the number of meetings the invitee has scheduled for that day, the topic of meetings the invitee has scheduled for that day, the people the invitee has recently met with, the people the invitee will soon meet with. Also note that $\psi_i$ depends directly on t, which allows a system and/or method of the present disclosure in one embodiment to capture an invitee's preference for different times of day.

For training data, a system and/or method of the present disclosure in one embodiment may mine a user's calendar to find examples of situations in which that user needed to schedule a meeting. For every meeting that user has created through the user's calendar application, a system and/or method of the present disclosure in one embodiment may record any number of contextual factors at the time the calendar item was created. For example, how many other meetings the user had that day, keywords associated with the item, activity in other applications (e.g., electronic mail), user's location. With these contextual factors as inputs, and the label suitable as the result, the positive portion of the required training examples is built. In one embodiment, standard classification and regression techniques may be performed on this positive set of examples.

In another embodiment, the system and/or method also may utilize negative examples, by looking at other available timeslots at the time the user created this calendar item that were not chosen.

In yet another embodiment, the system and/or method may record as a training example the calendar invites that the user did not accept despite not having a conflict.

In one embodiment, the system and/or method may treat schedule conflicts as low suitability scores, but not as hard constraints. This reflects the reality that meetings can be rescheduled if another, higher priority meeting is having trouble finding a suitable timeslot. In this approach a meeting priority score may need to be used, which may be defined explicitly by the user or inferred through inspection.

FIG. 1 is a diagram illustrating system components for a machine learning system for learning to intelligently identify suitable time slots in a user's electronic calendar and updating the calendar automatically in one embodiment of the present disclosure. In an embodiment, wherein the time slot is automatically updated, the output of the filter directly updates the calendar database, bypassing the client application. The components shown in FIG. 1 are computer executable components, for example, executing on one or more hardware processors. One or more of the hardware processors may be coupled to a memory device and or persistent storage device. A user's calendar database 102 stores user's calendar information such as the created schedules and user's context surrounding the create schedules. User's context may include factors such as how many other meetings the user had that day, keywords associated with the item, activity in other applications (e.g., electronic mail), user's location, and other information.

Such information may be mined from a user's calendar database 102 as training data, for example, input to a prediction model learner 104. The prediction model learner 104 is a machine learning system or algorithm that trains or builds a model based on the training data to predict a time slot for a meeting for a given user. A predictive model may be created for each user.

A calendar client 106, for example, may identify a set of invitees to invite to a meeting and meeting details. A score estimator 108 receives this information and may request a predictive model for each of the invitees. For instance, the score estimator 108 may request that the prediction model learner 104 build a predictive model for a respective invitee. In one aspect, an invitee may already have a predictive model built, in which case, the predictive model may be retrieved from a computer memory or storage device. In another aspect, for example, if the invitee does not have a predictive model associated with the invitee, the prediction model learner 104 may dynamically build a predictive model by mining or retrieving training examples from that user's calendar database and training a model based on the training examples.

The predictive model for each of the invitees may be executed or run on one or more hardware processors. A respective predictive model outputs suitability scores for each invitee and timeslot pair using the score estimator 108, which then combines these scores to compute a total suitability score of timeslots. Consider a simple scenario for instance where a given person, consistently starts work at 10:00 AM. The predictive model would learn that timeslots prior to this start time are generally not suitable to the user and would thus assign all such timeslots (e.g., 09:00 AM-09:30 AM) a low score (e.g. 0.01) for that user. These low suitability scores of an individual attendee would in turn reduce the aggregate suitability score for timeslots prior to 10:00 AM for the meeting in general.

A filter 110 running on one or more hardware processors may receive the time slot scores and filter the time slots to output the best fit time slots. Different filtering techniques may be applied, for instance a simple threshold based filtering may be used wherein only timeslots with a score above a defined threshold value are selected. As another example, a selection of the best 'N' timeslots may be used, where 'N' is a configurable number parameter.

The identified time slots are automatically updated in the user's calendar database 102, for example, via the calendar client 106.

In another aspect, the invitees may be automatically notified of the identified time slot via an alert. The alert may be in the form of an automatic text message, email, graphical display or a voice activated notification, for example, on the invitees' devices such as mobile phone or another device.

Figure 2:
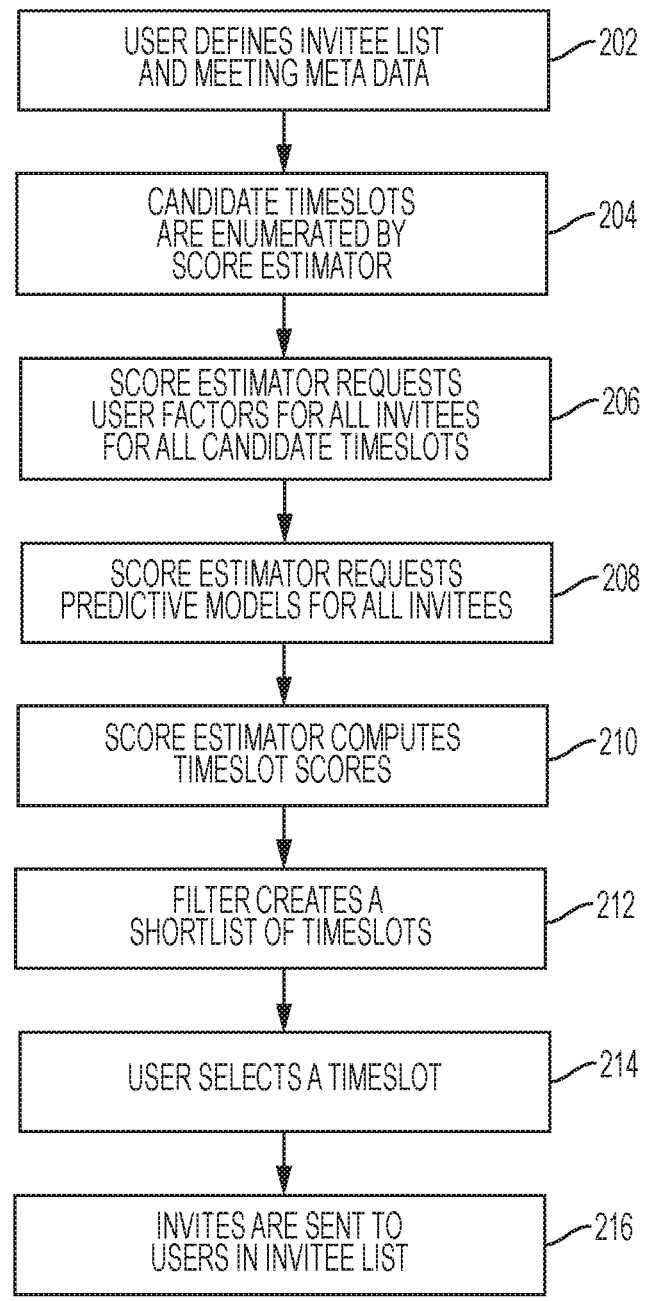
FIG. 2 is a flow diagram illustrating a method for a machine learning system for learning to intelligently identify suitable time slots in a user's electronic calendar in one embodiment of the present disclosure.

FIG. 2 is a flow diagram illustrating a method for a machine learning system for learning to intelligently identify suitable time slots in a user's electronic calendar in one embodiment of the present disclosure. At 202, a user may define an invitee list and meeting information, for example, using an electronic calendar application. The method of the present disclosure may receive the invitee list and information (or meta data) associated with the meeting. For instance, a score estimator component executing on one or more hardware processors may receive the invitee list and the information associated with the meeting. The information associated with the meeting may include the location, the topic/agenda, expected duration, and others.

At 204, a score estimator running on one or more hardware processors may enumerate candidate timeslots. This enumeration may be an exhaustive list of all available timeslots given metadata about the meeting. For instance, if a user specifies a meeting with a vague description of time ("30 minutes, next week") then all 30 minute time blocks within the working day may be enumerated as candidates. As another example, one or more rules may be used to reduce the set of possible candidates. For example, a system may be configured to only enumerate quarter hour time blocks, starting at either 00, 15, 30, or 45 minutes into the hour.

At 206, the score estimator running on one or more hardware processors may request user factors for all invitees for all candidate timeslots. The user factors may be inferred from the individual calendars of invitees in addition to other data sources such as email, and may include information such as location and metadata about other adjoining meetings scheduled for that day (number of meetings, topics of meetings, location, etc.)

At 208, the score estimator running on one or more hardware processors may request predictive models for all invitees, for example, a predictive model per invitee. The predictive models may be executed on one or more hardware processors. The predictive model may output a set of parameter values and weights, which indicates the level of importance of each contextual factor to the specific user. Various formats for encapsulating this information may be used.

At 210, the score estimator running on one or more hardware processors may compute timeslot scores. At least one score for each candidate timeslot enumerated at 204 is output by the estimator, wherein the score for a timeslot is aggregated from the suitability score of the timeslot for each invitee At 212, a filter running on one or more hardware processors may create a shortlist or a list of timeslots. Different filtering techniques may be applied, for instance a simple threshold based filtering may be used wherein only timeslots with a score above a defined threshold value are selected. As another example, a selection of the best 'N' timeslots may be used, where 'N' is a configurable numeric parameter.

At 214, a user may be given an option to select a time slot, for example, via a user interface of a calendar application.

At 216, invites are sent to the users in the invitee list for the selected time slot.

Figure 3:
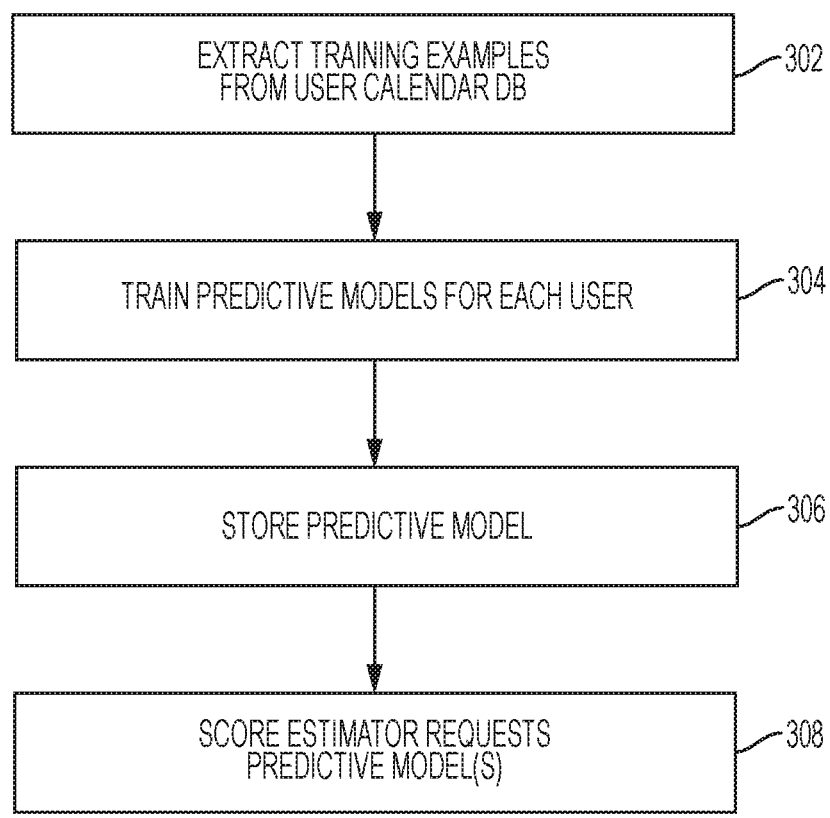
FIG. 3 is a flow diagram illustrating a method for a prediction model learner in one embodiment of the present disclosure.

In one embodiment, given a tuple {set of invitees S, meeting meta data M}, a set of candidate timeslots are enumerated by inspecting the availability of invitees. In one embodiment, potentially conflicting time slots may qualify to be one of the candidate timeslot. For example, even though an invitee may already have a meeting tentatively scheduled for a timeslot, that timeslot may still be considered for the new meeting as it may be the best option given other factors. For each timeslot, for each invitee, the user factors that may influence the suitability score are queried from a database. For each invitee a pre-trained predictive model, for example, described with reference to FIG. 3, is retrieved. For each timeslot, for each invitee, the predictive model evaluates the applicable user factors and outputs a score for the timeslot for each invitee. The scores of each invitee for a timeslot are aggregated via an aggregation function to form a timeslot score. Examples of the aggregation function may include, but are not limited to, a simple sum, and user-weighted averages. Timeslots are ranked by score and a filter creates a list, e.g., a shortlist. This list may include the top-k timeslots, or it may use another criteria such as 'best timeslot each day for the next k days'. This ordered collection of timeslots is presented to the user where one can be chosen. In another embodiment, the best ranked timeslot is automatically chosen. In yet another embodiment, the timeslot choice is deferred until closer to the day. Once a slot has been, chosen invitees are notified, for example, by automatic insertion in their electronic calendar system.

In another aspect, responsive to the determined target time slot that is determined to be suitable for all invitees, the invitees' designated devices may be caused to display the meeting details or open a meeting session at (or predetermined time ahead of) the target time of the meeting.

FIG. 3 is a flow diagram illustrating a method for a prediction model learner in one embodiment of the present disclosure. At 302, training examples are extracted from a user's electronic calendar database. For example, as described above, for training data, a system and/or method of the present disclosure in one embodiment may mine a user's calendar. For every meeting that user has created through the user's calendar application, a system and/or method of the present disclosure in one embodiment may record any number of contextual factors at the time the calendar item was created. For example, how many other meetings the user had that day, keywords associated with the item, activity in other applications (e.g., electronic mail), user's location.

At 304, based on the training examples, a predictive model is trained for a particular user. For instance, for each user or invitee, a predictive model may be built. In one embodiment, for example, contextual factors derived from a user's calendar history (e.g., time of day of past calendar invites, topic, etc.) may be used to create a positive training set (i.e., a set of suitable timeslots) that may be fed into standard classification and/or regression techniques. In one embodiment, a negative training set may also be inferred by extracting the other timeslots that a user chose not to schedule meetings in, while having been suitable candidates. This negative training set may then be used to train the predictive model. In yet another embodiment, the system and/or method may record as a training example the calendar invites that the user did not accept despite not having a conflict. Such examples may all be provided as feature vectors to build a predictive model, for example, a classification, regression, or another machine learning model.

At 306, the predictive model is stored, for example, in a storage device. At 308, score estimator requests the predictive model. The predictive model received by the score estimator may include a set of parameter values and weights, which indicates the level of importance of each contextual factor to the specific user, as learnt by the predictive model learner, based on the users training data. Various formats for encapsulating this information may be used. Based on the set of parameter values and weights, the candidate timeslots may be scored.

The learning technique may include information about the individual, the organization, the industry and other considerations. In this way, the efforts of all users may be leveraged to improve a meeting scheduling experience for all users. This also allows the system and/or method of the present disclosure to pre-populate a prediction model for new users; those without a history of calendar use. In another aspect, the system and/or method of the present disclosure may collect feedback from the user regarding the "goodness of fit" of the chosen timeslot such that further learning can be gained and used to retrain the predictive models.

The total suitability index also considers existing calendar items, such that the rescheduling cost can be accounted for and higher priority meetings can be pushed into lower priority ones.

The machine learning methodology of the present disclosure may reduce manual effort for a meeting organizer, reduce likelihood of meetings being rescheduled, and improve total satisfaction of invitees.

A suitability prediction in one embodiment of the present disclosure may differentiate multiple available timeslots to maximize suitability among all participants or invitees, for example, based on learning individual user preference and for example, mining calendar data such as meeting preferences, travel, weather, invitees, meeting importance related to other schedule views, and location.

Figure 4:
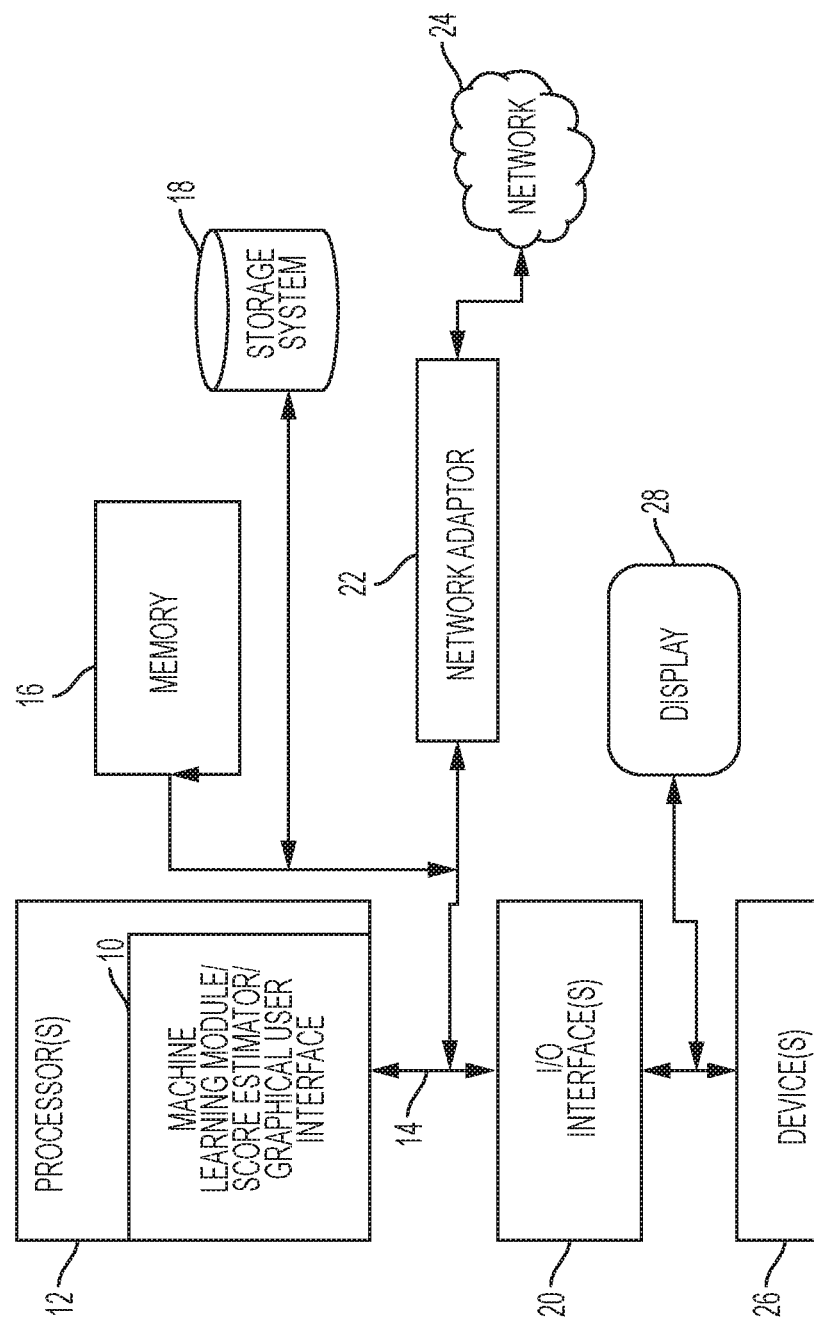
FIG. 4 illustrates a schematic of an example computer or processing system that may implement a machine learning system that intelligently identifies time slots in one embodiment of the present disclosure.

FIG. 4 illustrates a schematic of an example computer or processing system that may implement a machine learning system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 4 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a machine learning module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A computer-implemented method of training a machine to learn and to identify time slots to select in a user's electronic calendar, the method performed by at least one hardware processor, comprising:
   receiving an invitee list and meeting meta data associated with a meeting via an electronic calendar application;
   determining candidate timeslots for the meeting;
   analyzing a database associated with the electronic calendar application to obtain user factors associated with the candidate timeslots and invitees in the invitee list, the user factors comprising user created schedules and context associated with the user created schedules, the context comprising a number of meetings a user held on a same day as the user created schedules, activity in applications and location, time periods the user chose not to create schedules despite availability of the time periods, and calendar invites the user declined despite not having a conflict;
   requesting a machine learned predictive model associated with an invitee in the invitee list for each of the invitees in the invitee list, the requesting comprising, responsive to determining that a machine learned predictive model is not available for an invitee in the invitee list, requesting that the machine learned predictive model be dynamically built,
   the machine learned predictive model generated by executing a machine learning algorithm with training features comprising historical data associated with the user factors, the generated machined learned predictive model comprising learned parameters and weights associated with the user factors calibrated to output a suitability score associated with an invitee-time slot pair;
   executing the machine learned predictive model on the at least one hardware processor based on the invitee list and the meeting meta data, execution of the machine learned predictive model outputting the suitability score associated with an invitee-time slot pair for each of the invitees and the candidate timeslots combination;
   determining a time slot to select based on an output from the machine learned predictive model for the respective invitee;
   combining time slots of respective invitees to determine a target time slot, wherein the candidate timeslots can comprise an unavailable time slot of an invitee, and responsive to determining that the target time slot includes the unavailable time slot of the invitee, moving out a previously scheduled event scheduled in the unavailable time slot of the invitee to make the unavailable time slot available; and
   automatically triggering electronic calendar applications associated with the invitees to insert the meeting in the target time slot, to automatically update respective electronic calendars associated with the invitees.

2. The method of claim 1, further comprising:
   updating the database associated with the electronic calendar application with the determined time slot.

3. The method of claim 1, wherein a training example set for the machine learning algorithm comprises the user factors and the associated candidate timeslots.

4. The method of claim 1, further comprising sending a notification of the time slot to one or more invitees in the invitee list.

5. The method of claim 1, further comprising:
   providing a graphical user interface, wherein the invitee is allowed to change the target time slot, wherein the change is stored and used to further train the machine and update the predictive model.

6. The method of claim 1, wherein the analyzing, the generating, the executing and the determining a time slot are performed for all invitees in the invitee list.

7. A non-transitory computer readable storage medium storing a program of instructions executable by a machine to perform a method of training a machine to learn and identify time slots to select in a user's electronic calendar, the method comprising:
   receiving an invitee list and meeting meta data associated with a meeting via an electronic calendar application;
   determining candidate timeslots for the meeting;
   analyzing a database associated with the electronic calendar application to obtain user factors associated with the candidate timeslots and invitees in the invitee list, the user factors comprising user created schedules and context associated with the user created schedules, the context comprising a number of meetings a user held on a same day as the user created schedules, activity in applications and location, time periods the user chose not to create schedules despite availability of the time periods, calendar invites the user declined despite not having a conflict;
   requesting a machine learned predictive model associated with an invitee in the invitee list for each of the invitees in the invitee list, the requesting comprising, responsive to determining that a machine learned predictive model is not available for an invitee in the invitee list, requesting that the machine learned predictive model be dynamically built,
   the machine learned predictive model generated by executing a machine learning algorithm with training features comprising historical data associated with the user factors, the generated machined learned predictive model comprising learned parameters and weights associated with the user factors calibrated to output a suitability score associated with an invitee-time slot pair;

executing the machine learned predictive model on one or more of the hardware processors based on the invitee list and the meeting meta data, execution of the machine learned predictive model outputting the suitability score associated with an invitee-time slot pair for each of the invitees and the candidate timeslots combination;

determining a time slot to select based on an output from the machine learned predictive model for each of the invitees;

determining a target time slot based on the time slot selected for each of the invitees, wherein the candidate timeslots can comprise an unavailable time slot of an invitee, and responsive to determining that the target time slot includes the unavailable time slot of the invitee, moving out a previously scheduled event scheduled in the unavailable time slot of the invitee to make the unavailable time slot available; and automatically triggering electronic calendar applications associated with the invitees to insert the meeting in the target time slot, to automatically update respective electronic calendars associated with the invitees.

8. The computer readable storage medium of claim 6, further comprising:

updating the database associated with the electronic calendar application with the determined time slot.

9. The computer readable storage medium of claim 6, wherein a training example set for the machine learning algorithm comprises the user factors and the associated candidate timeslots.

10. The computer readable storage medium of claim 6, further comprising sending a notification of the time slot to one or more invitees in the invitee list.

11. The computer readable storage medium of claim 6, further comprising:

providing a graphical user interface, wherein the invitee is allowed to change the time slot, wherein the change is stored and used to further train the machine and update the predictive model.

12. The computer readable storage medium of claim 6, wherein the analyzing, the generating, the executing and the determining a time slot are performed for all invitees in the invitee list.

13. A system of training a machine to learn and identify time slots to select in a user's electronic calendar, comprising:

one or more hardware processors operable to receive an invitee list and meeting meta data associated with a meeting via an electronic calendar application, one or more of the hardware processors further operable to determine candidate timeslots for the meeting;

a storage device storing a database associated with the electronic calendar application, one or more of the hardware processors further operable to analyze the database to obtain user factors associated with the candidate timeslots and invitees in the invitee list, the user factors comprising user created schedules and context associated with the user created schedules, the context comprising a number of meetings a user held on a same day as the user created schedules, activity in applications and location, time periods the user chose not to create schedules despite availability of the time periods, calendar invites the user declined despite not having a conflict, one or more of the hardware processors further operable to request a machine learned predictive model associated with an invitee in the invitee list for each of the invitees in the invitee list, the requesting comprising, responsive to determining that a machine learned predictive model is not available for an invitee in the invitee list, requesting that the machine learned predictive model be dynamically built, the machine learned predictive model generated by executing a machine learning algorithm with training features comprising historical data associated with the user factors, the generated machined learned predictive model comprising learned parameters and weights associated with the user factors calibrated to output a suitability score associated with an invitee-time slot pair;

one or more of the hardware processors further operable to execute the machine learned predictive model based on the invitee list and the meeting meta data, execution of the machine learned predictive model outputting the suitability score associated with an invitee-time slot pair for each of the invitees and the candidate timeslots combination, and determine a time slot to select based on an output from the machine learned predictive model, one or more of the hardware processors further operable to combine time slots of respective invitees to determine a target time slot, wherein the candidate timeslots can comprise an unavailable time slot of an invitee, and responsive to determining that the target time slot includes the unavailable time slot of the invitee, moving out a previously scheduled event scheduled in the unavailable time slot of the invitee to make the unavailable time slot available; and the one or more of the hardware processors automatically triggering electronic calendar applications associated with the invitees to insert the meeting in the target time slot, to automatically update respective electronic calendars associated with the invitees.

14. The system of claim 13, wherein one or more of the hardware processors further operable to update the database associated with the electronic calendar application with the determined time slot.

15. The system of claim 13, wherein a training example set for the machine learning algorithm comprises the user factors and the associated candidate timeslots.

16. The system of claim 13, wherein one or more of the hardware processors further operable to send a notification of the time slot to one or more invitees in the invitee list.

17. The system of claim 13, further comprising:

a graphical user interface, wherein the invitee is allowed to change the target time slot, wherein the change is stored and used to further train the machine and update the predictive model.

18. The system of claim 13, wherein one or more of the hardware processors analyze, generate, execute and determine a time slot for all invitees in the invitee list.

19. The method of claim 1, wherein the determining a time slot to select based on an output from the predictive model for the respective invitee comprises selecting a threshold number of time slots for each invitee based on the suitability score output by the predictive model, and the combining time slots of respective invitees to determine a target time slot comprises, for each time slot determining a normalized sum of the suitability score of each of the invitees and selecting as the target time slot, a slot having the highest normalized sum.

* * * * *